US008251198B2

(12) United States Patent
Zwieg et al.

(10) Patent No.: US 8,251,198 B2

(45) Date of Patent: Aug. 28, 2012

(54) SELF-SERVICE CASH HANDLING MACHINE AND METHOD WITH CONFIGURABLE COIN STORAGE

(75) Inventors: Robert L. Zwieg, Watertown, WI (US); Thomas P. Adams, Oconomowoc, WI (US); Jon R. Stieber, Oconomowoc, WI (US); Myron W. Spoehr, Lake Mills, WI (US); Daniel J. Folger, Oconomowoc, WI (US); Robert E. Gunst, Neosho, WI (US)

(73) Assignee: Talaris Inc., Watertown, WI (US)

( * ) Notice: Subject to any disclaimer, the term of this patent is extended or adjusted under 35 U.S.C. 154(b) by 2067 days.

(21) Appl. No.: 10/896,472

(22) Filed: Jul. 22, 2004

(65) Prior Publication Data

US 2006/0070843 A1 Apr. 6, 2006

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2011.01) |

(52) U.S. Cl. ........ 194/217; 194/215; 194/344; 194/350; 453/6; 453/10; 453/12; 453/16; 453/49; 453/57

(58) Field of Classification Search .................. 221/192; 222/390; 414/304; 193/23, DIG. 1; 194/215–217, 194/344, 346, 350, 353; 453/1–3, 6, 10, 453/12, 13, 16, 17, 19–21, 29, 30, 32–35, 453/39, 49, 57, 58, 61–63

See application file for complete search history.

(56) References Cited

U.S. PATENT DOCUMENTS

| | | | | |
|---|---|---|---|---|
| 4,960,196 | A * | 10/1990 | Kanehara et al. | 194/215 |
| 5,067,928 | A * | 11/1991 | Harris | 453/17 |
| 5,190,133 | A * | 3/1993 | Bolen | 194/350 |
| 5,830,054 | A * | 11/1998 | Petri | 453/5 |
| 6,264,545 | B1 | 7/2001 | Magee et al. | |
| 6,318,537 | B1 * | 11/2001 | Jones et al. | 194/346 |
| 6,484,863 | B1 | 11/2002 | Molbak | |
| 6,494,776 | B1 * | 12/2002 | Molbak | 453/32 |
| 6,637,576 | B1 | 10/2003 | Jones et al. | |
| 6,736,251 | B2 | 5/2004 | Molbak | |
| 6,983,836 | B2 * | 1/2006 | Adams et al. | 194/302 |
| 2002/0065033 | A1 | 5/2002 | Geib et al. | |
| 2004/0231956 | A1 * | 11/2004 | Adams et al. | 194/217 |

FOREIGN PATENT DOCUMENTS

EP 0 391 403 A2 10/1990

* cited by examiner

*Primary Examiner* — Jeffrey Shapiro

(74) *Attorney, Agent, or Firm* — Boyle Fredrickson, S.C.

(57) ABSTRACT

A self-service change redemption machine (10) has an intake area (18) for receiving batches of mixed coinage and conveying the coins to a coin sorter (22) for sorting, counting and directing coins into a plurality of coin chutes (26). From there, the coins are routed to coin receptacles such as bags (60). Multiple bags are provided for certain denominations. To fill multiple bags for a given denomination, repositionable diverter mechanisms (30) are provided between the chutes (26) and pluralities of bags for the respective denominations. The bags are held by bag holders (34) which extend downward from a substantially rigid one-piece chassis (40), which also supports the diverter mechanisms (30). The machine (10) has buttons (80) responsive to inputs from a user to turn on the machine, to process coins that are input through the intake area (18) and to issue the voucher or other form of credit. Instructions for using the machine (10) and other information are displayed on a screen display (15).

13 Claims, 12 Drawing Sheets

SELF-SERVICE CASH HANDLING MACHINE AND METHOD WITH CONFIGURABLE COIN STORAGE

TECHNICAL FIELD

The present invention relates to self-service cash redemption machines and methods in which a substantial batch of unsorted coinage is fed in bulk into a hopper and is processed for collection while providing the user with a voucher or a form of credit, on a card, for example.

DESCRIPTION OF THE BACKGROUND ART

The invention relates to a system and to a method in which a substantial number of unsorted coins (greater than the amounts spent in vending machines for purchasing items) are deposited in the machine. The coins are sorted and counted to determine a total value. The user is issued a voucher for an amount related to the total value.

This offers a service to the consumer and provides a commission to the sponsoring organization. Since the introduction of state and local sales taxes, goods have been priced in such a way that people tend to accumulate a great deal of coinage. People tend to store this coinage in their homes. There have been few receivers of large amounts of coin change from consumers, other than banks, and people do not prefer to carry significant amounts of change in their pockets or purses. In recent years, certain voucher dispensing machines have been seen in grocery stores, which provide a voucher to the consumer for buying groceries or other items at the store or for redemption for cash. Some amount of the transaction is retained as a commission, usually less than 10%. Examples of machines for carrying out these transactions are shown and described in U.S. Pat. Nos. 6,736,251, 6,494,776, 6,484,863 and earlier related patents cited therein.

Various other types of machines for both receiving coins and providing the consumer with a credit have been known, including ATM machines and large cash handling machines for gaming operations. ATM machines have generally been limited to dispensing small amounts of change for a dollar, cash withdrawals in the form of bills, or pre-rolled rolls of coin. The large cash handling machines for gaming establishments sort the change into bins, which must then be emptied and further processed before being placed in a dispenser or distributed to customers through cashiers.

The prior art shows various distribution systems for routing coins. U.S. Pat. No. 6,318,557 shows a system with a first manifold, exit chutes, and rotating coin distributors for distributing coins to manifolds which feed coins to coin receptacles. Magee et al., U.S. Pat. No. 6,245,545, shows a system for separating pennies from other denominations and sending the pennies and non-pennies to two respective chambers, because it is said that pennies constitute up to seventy-five percent of the coins deposited in self-service machines.

There remains a need for a self-service coin recycling machine, which is easy for an average user to operate, and which reliably sorts and counts the coinage deposited. The machine should be easy and convenient to service, to maintain and to remove the accumulated coinage. The machine should be capable of dispensing a receipt, a voucher or a form of credit.

SUMMARY OF THE INVENTION

The invention relates to a method and a machine for receiving a batch of unsorted coinage from a user, for sorting coins into a plurality of denominations and for dispensing a receipt, a voucher or a form of credit to the user, in which coins of at least one denomination are conveyed from the sorter through a first chute; and in which a coin diverter mechanism located at an exit of the first chute is repositioned from a first position to at least two other positions in alignment with respective entrances for at least two other coin receptacles for that denomination.

In contrast to the prior art, the diverters are repositioned to align with each of the coin receptacles, and therefore, the use of additional manifolds for routing the coins is unnecessary.

The invention also provides for selectable unique coin distributions based on the volume of different denominations received in self-service machines. In one such distribution, there are three receptacles for U.S. pennies, three for U.S. quarters, two for U.S. nickels and two for U.S. dimes. In a method of the present invention, the diverter mechanisms can be reconfigured or adjusted to distribute coins to a plurality of from one to four receptacles depending on the coin distribution plan.

The diverter mechanisms are supported on a common rigid support that aids alignment with the various other parts from which coins are received and then distributed. The support is slidable out of the machine for servicing the parts.

The machine provides advantageous configurations of the coin collection receptacles by arranging them in a 2×6 matrix accessible through a side door in a two-deep configuration. A 2×5 or 2×4 matrix would also be particularly advantageous.

Other objects and advantages of the invention, besides those described above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
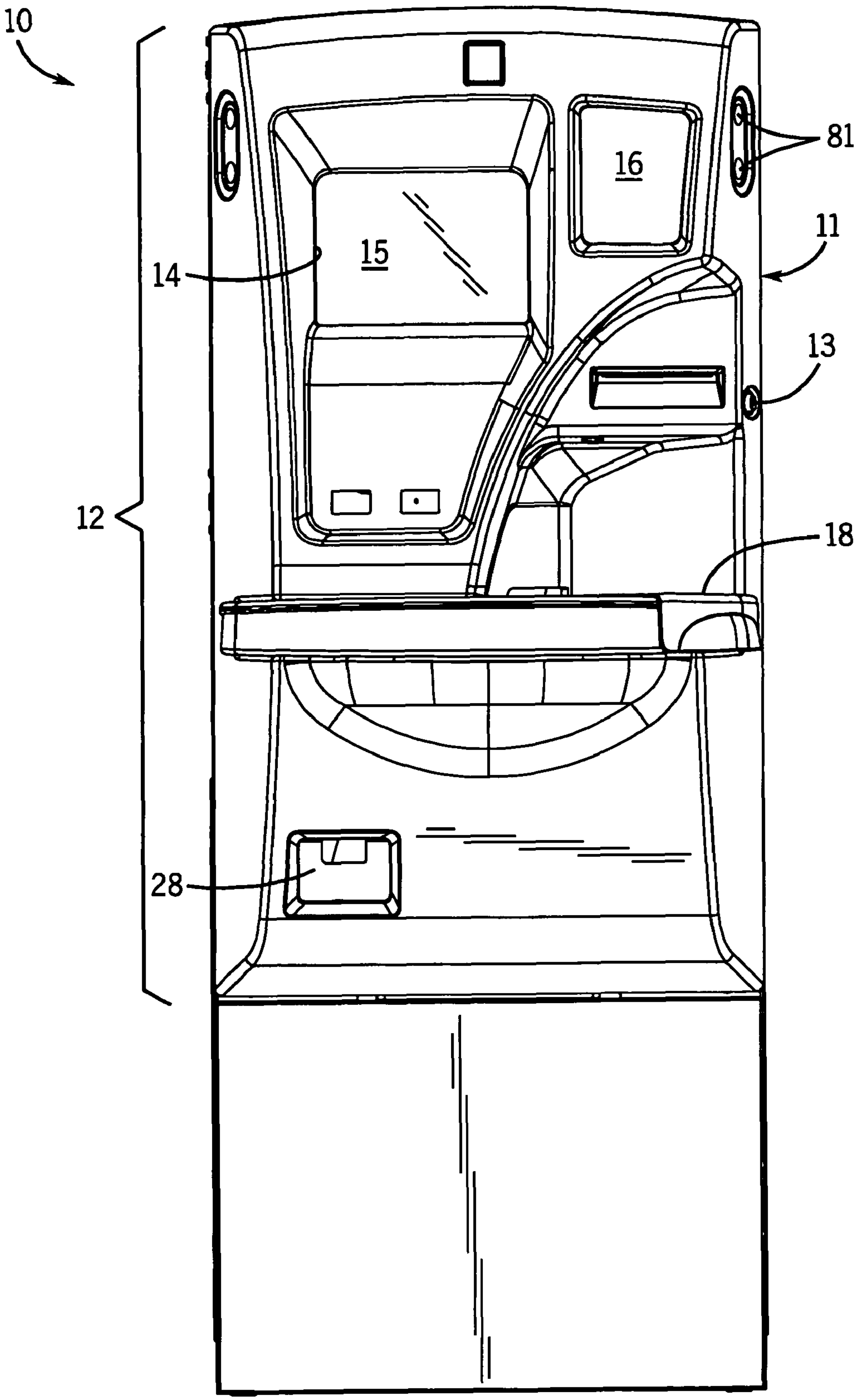
FIG. 1 is a front view in elevation of a first embodiment of a self-service cash redemption machine according to the present invention.

FIG. 1 shows a self-service cash redemption machine 10 in accordance with the present invention. The machine is housed in an cabinet enclosure 11 having a front door panel 12 secured by a key lock 13. The cabinet is substantially opaque, however, one or two inconspicuous windows may be provided for viewing the internal mechanisms of the machine for servicing purposes. The upper panel 12 has an opening 14 for viewing a visual display screen 15. Below this screen 15 are two buttons 80, identified as "A" and "B", for allowing the user to enter selections of items on the screen 15. To the right of the display is an area for an advertising display 16 and below that is a printout slot 17 for receiving a receipt or other printable matter that exits a printer installed inside the enclosure 11. Just below the printer output slot 17 is a coin intake area with a tray 18 that can be lifted to allow coins to slide into the machine 10.

The coin intake tray 18 can receive a batch of unsorted coins of mixed denomination and is lifted to feed them into the machine through an opening 18*a* (FIG. 3) to a coin processing assembly 21 (FIG. 4) inside the machine 10. This batch of coins is greater in amount than the coins typically inserted into a vending machine, for example, to purchase a product. The batch of coins can be supplemented as the machine is operating so that it can process anywhere from a few dollars to perhaps two hundred dollars in U.S. coinage.

Figure 2:
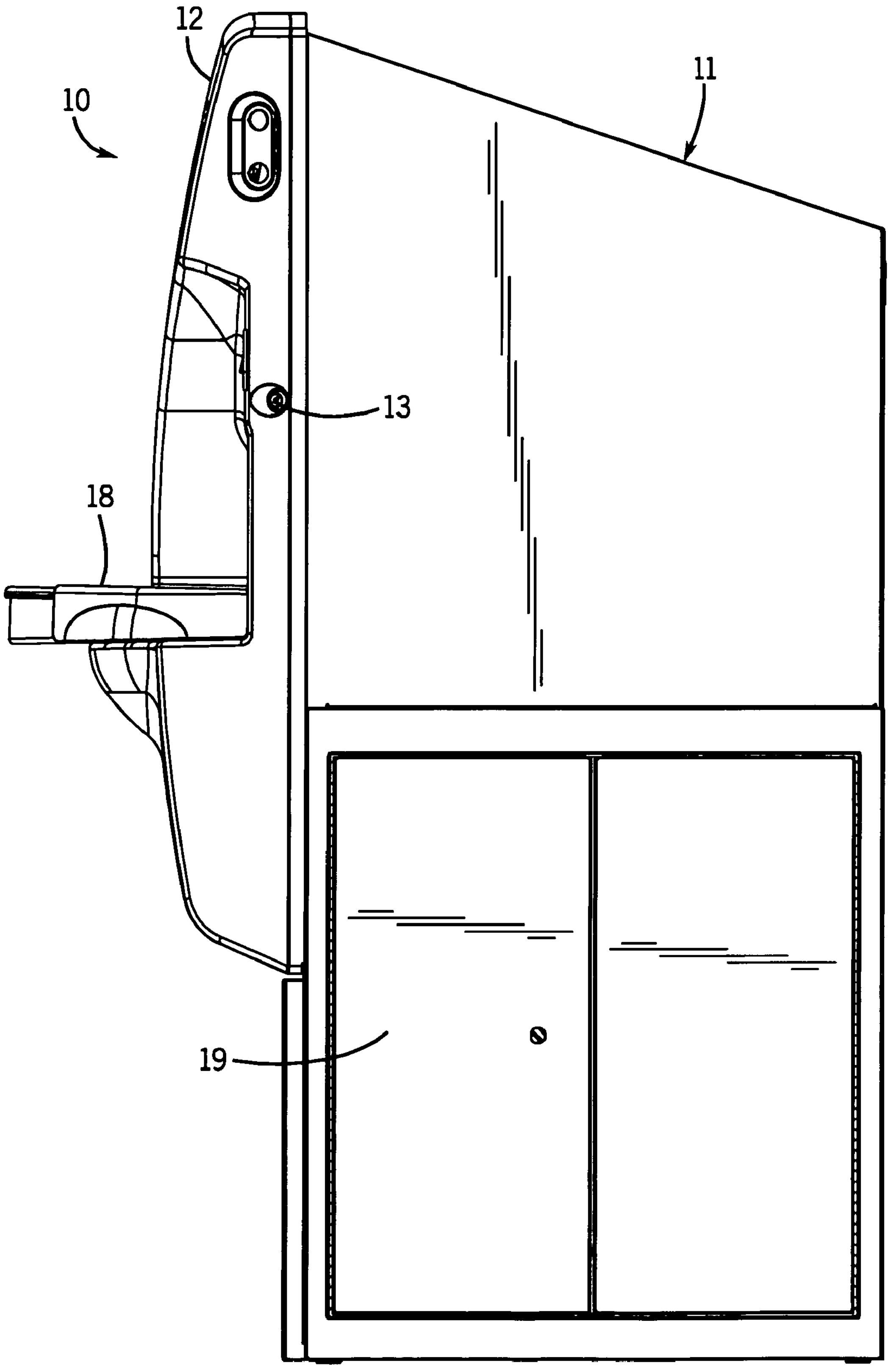
FIG. 2 is a right side view in elevation of the machine of FIG. 1.
Figure 3:
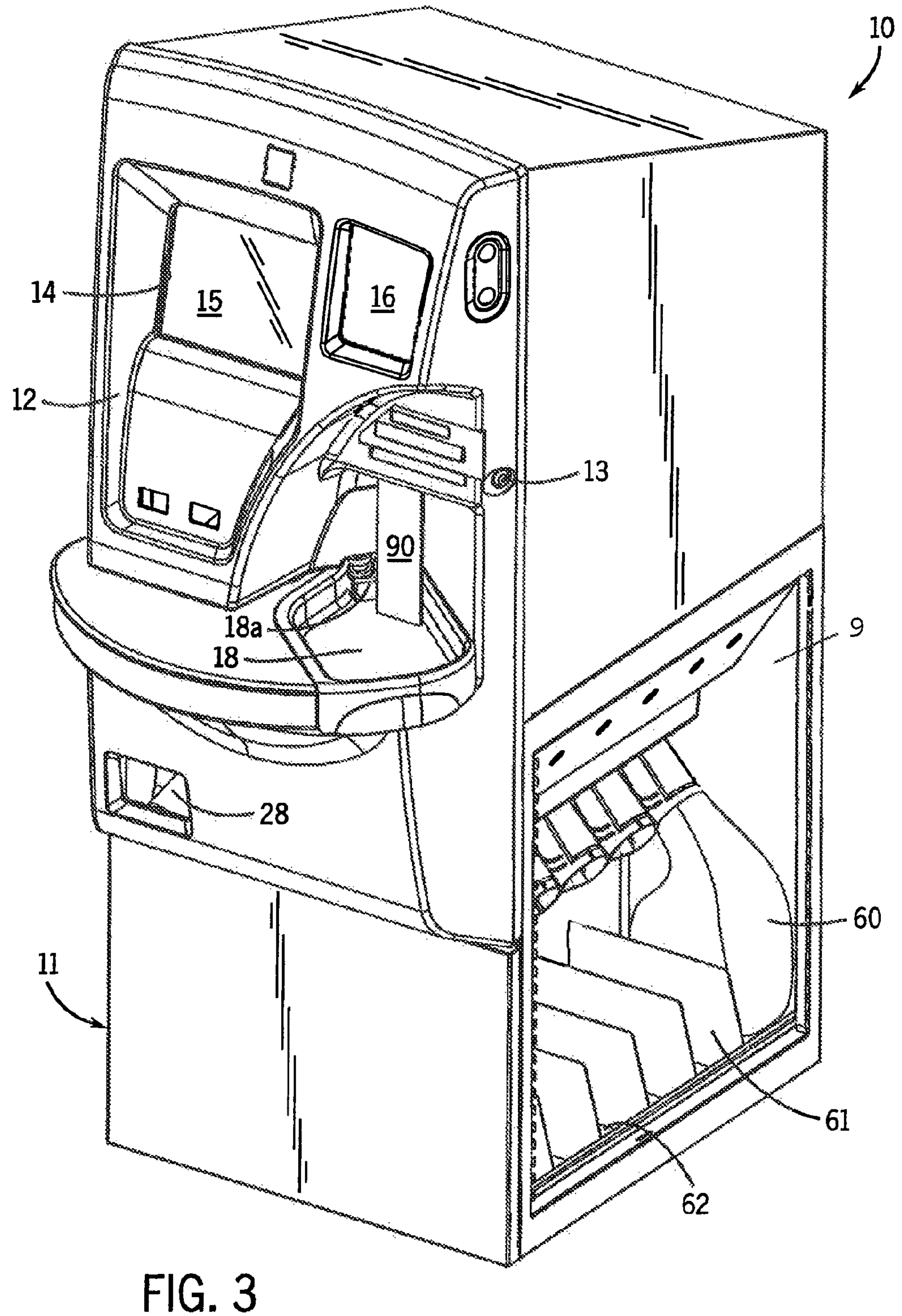
FIG. 3 is a perspective view of the machine of FIGS. 1 and 2 with a side door removed for a better view of the interior.

As seen in FIGS. 2 and 3, there are side access doors 19 on opposite sides (one side being shown in the drawings), which can be opened to install and remove coin receptacles, which in this instance are coin bags that would be attached to coin bag holders. The bags are kept separate by dividers 61 rising from a base plate 62 in the bottom of the cabinet enclosure 11. The machine provides an advantageous configuration of the coin collection receptacles by arranging them in a 2×6 matrix in a compartment 9 in the enclosure 11 that is accessible through the side door 19 with the receptacles in a two-deep configuration, as will be apparent from the detailed description of the figures which follow. Other advantageous configurations such as 2×4 or 2×5 might also be used.

Figure 4:
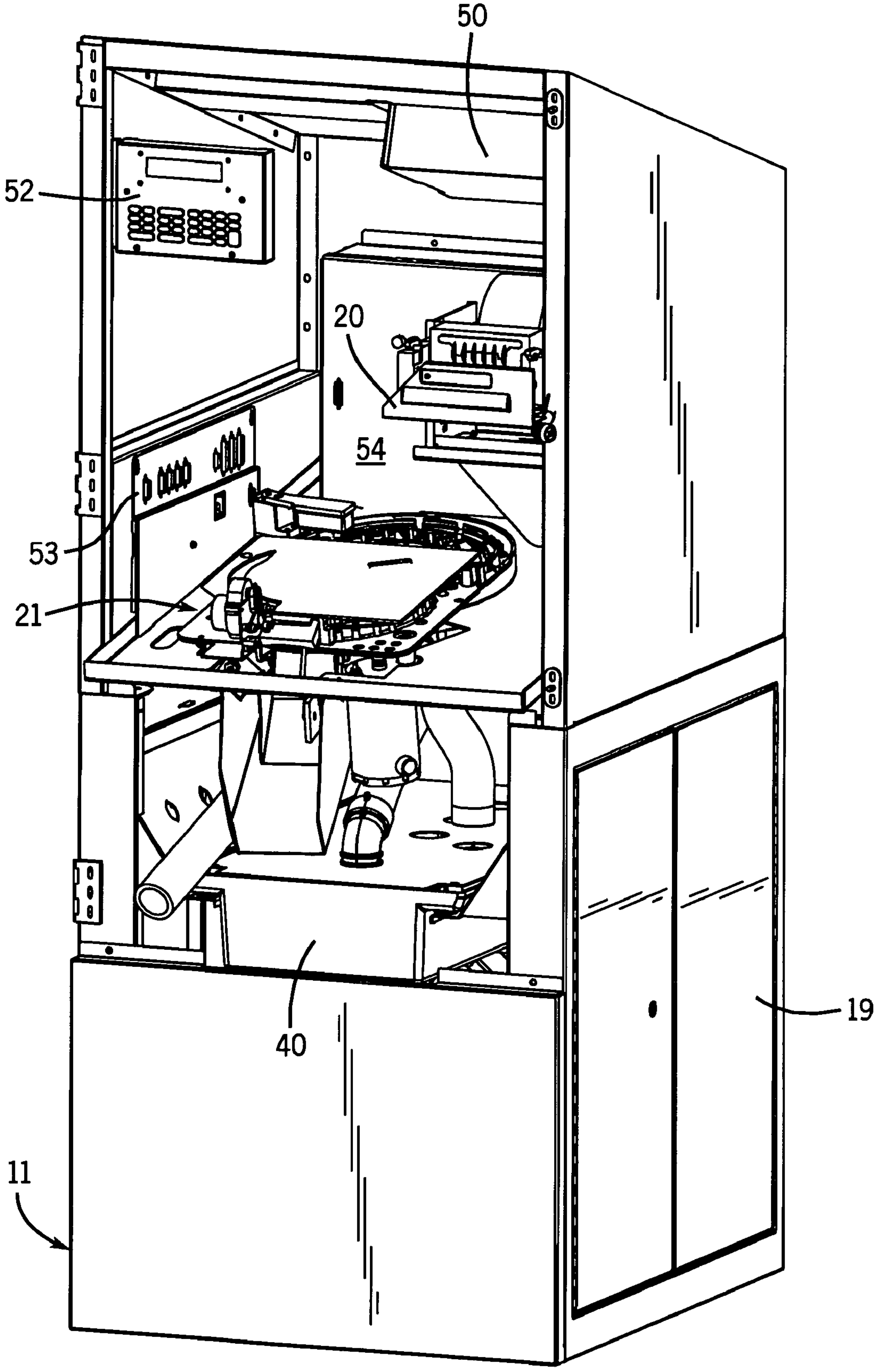
FIG. 4 is a frontal perspective view of the machine of FIGS. 1 and 2 with front panels removed for viewing an interior of the machine.

FIG. 4 shows the machine with the front panels 12 and 13 removed. The printer 20 is now visible, along with a coin processing assembly 21 that is supported and an elongated one-piece cast member 40 that can slide forward and out of the enclosure for servicing other components in the machine 10. This member 40 defines a to wall of the compartment 9 for containing the coin collection receptacles and for separating the compartment from a sorting mechanism and a plurality of chutes to be described in more detail below.

The printer 20 operates under the control of a personal computer (PC) 50, which is shown as a box in FIG. 4. The personal computer 50 also controls the display 15. Also seen in an interior of the cabinet 11 is a service keyboard 52, a controller 53 and a power supply 54. The controller 53 is also connected to the I/O devices such as the count sensors on a sorting mechanism 22 and others devices to be described herein. The printer 20 can print out a voucher or receipt 90 as seen in FIG. 3 representing the amount of coinage fed into the coin processing assembly 21 and counted by the controller 53 through sensing devices on the sorting mechanism 22 of the coin processing assembly 21. The user can present this voucher or receipt 90 in payment for merchandise, or could, where permitted, redeem it for cash in the form of notes and a small amount of change less than one dollar. An output device for issuing a card with a pre-paid credit amount, like a phone card, could also be used in place of the printer.

Figure 5:
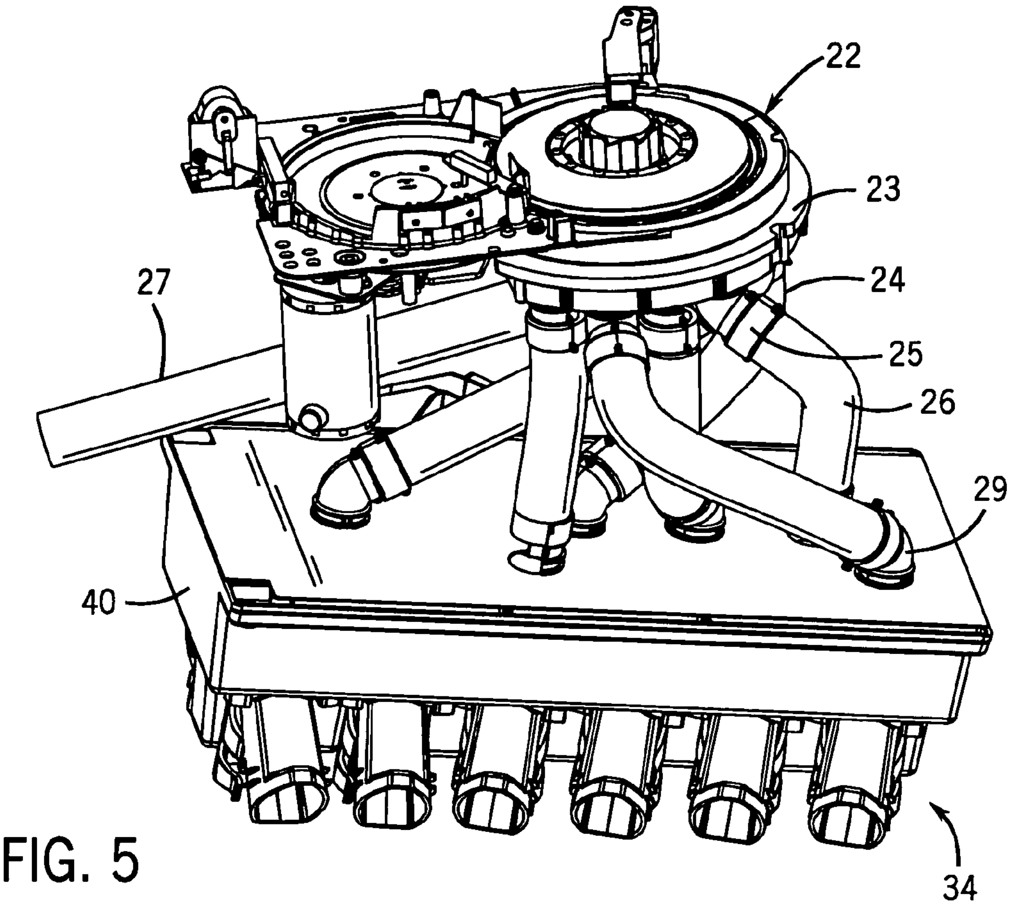
FIG. 5 is a detail perspective view of a sorting subassembly of the machine of FIG. 2.
Figure 6:
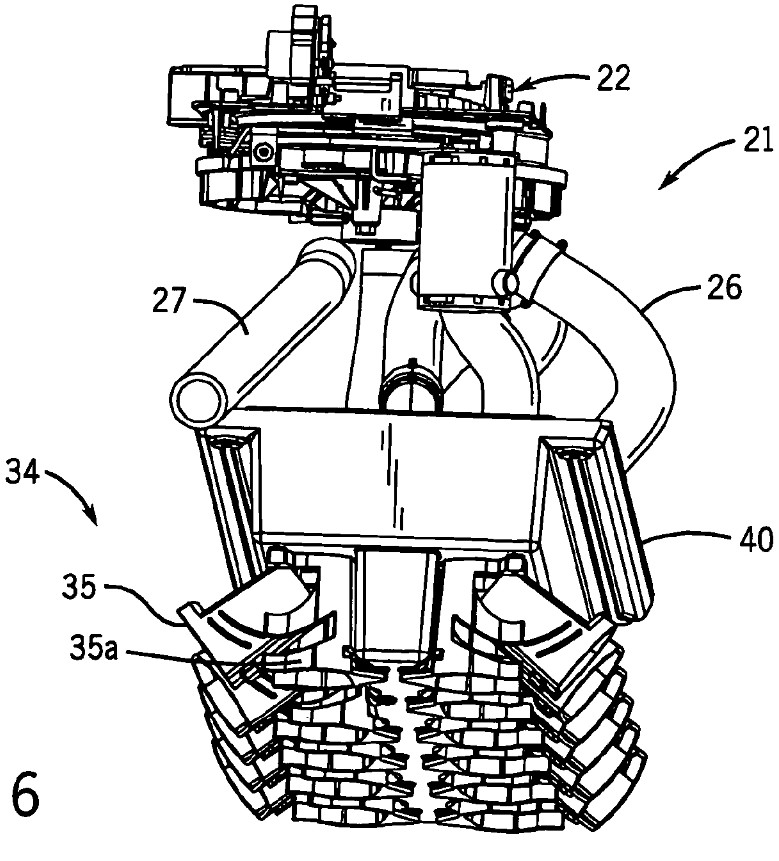
FIG. 6 is a bottom perspective view of the subassembly of FIG. 5.

FIG. 5 shows the details of the coin processing assembly 21 including a sorting mechanism 22 of same kind as is commercially available in the assignee's Mach® 6 line of dual disc coin sorters. As is well known in the art, the coins are deposited on a queueing disc and transferred to a sorting plate where they fall through slots sized for different denominations. For details of the construction and operation of dual disc sorters, the disclosures in Adams et al, U.S. Pat. Nos. 5,295,899 and 5,525,104 and Adams et al., U.S. Pat. No. 5,992,602, issued Nov. 30, 1999, and Zwieg et al., U.S. Pat. No. 6,640,956, issued Nov. 4, 2003, are incorporated herein by reference. In addition, the sorting mechanism 22 is inclined at an angle of from ten to fifteen degrees to assist in removal of spurious matter that may be introduced into the sorter with the batch of coins. The base 23 of the sorting mechanism 22 forms coin exit spouts 24 for each denomination and a plurality of upper elbow couplings 25 are connected to the respective spouts 24 to receive the respective denominations. The elbow couplings 25 are further connected to chutes 26, one for each denomination. In addition, there is an offsort opening that is coupled through one of the coin exit spouts 24 to a chute 27 that returns offsorted coins (coins of another country for example) through the chute 27 to an opening 28 in front of the enclosure 11 (FIG. 1). The offsort chute 27 is configured in a straight-line configuration in this embodiment, but could be constructed in other configurations that are not straight.

In this example, the sorting mechanism 22 is configured to sort the U.S. set of coinage including pennies, nickels, dimes, quarters, half dollars and U.S. dollar coins. It is also possible to sort U.S. dollar coins. And, it is also possible to configure the sorting mechanism 22 to sort euros or coins of other coin sets such as the coins of Canada.

Figure 7:
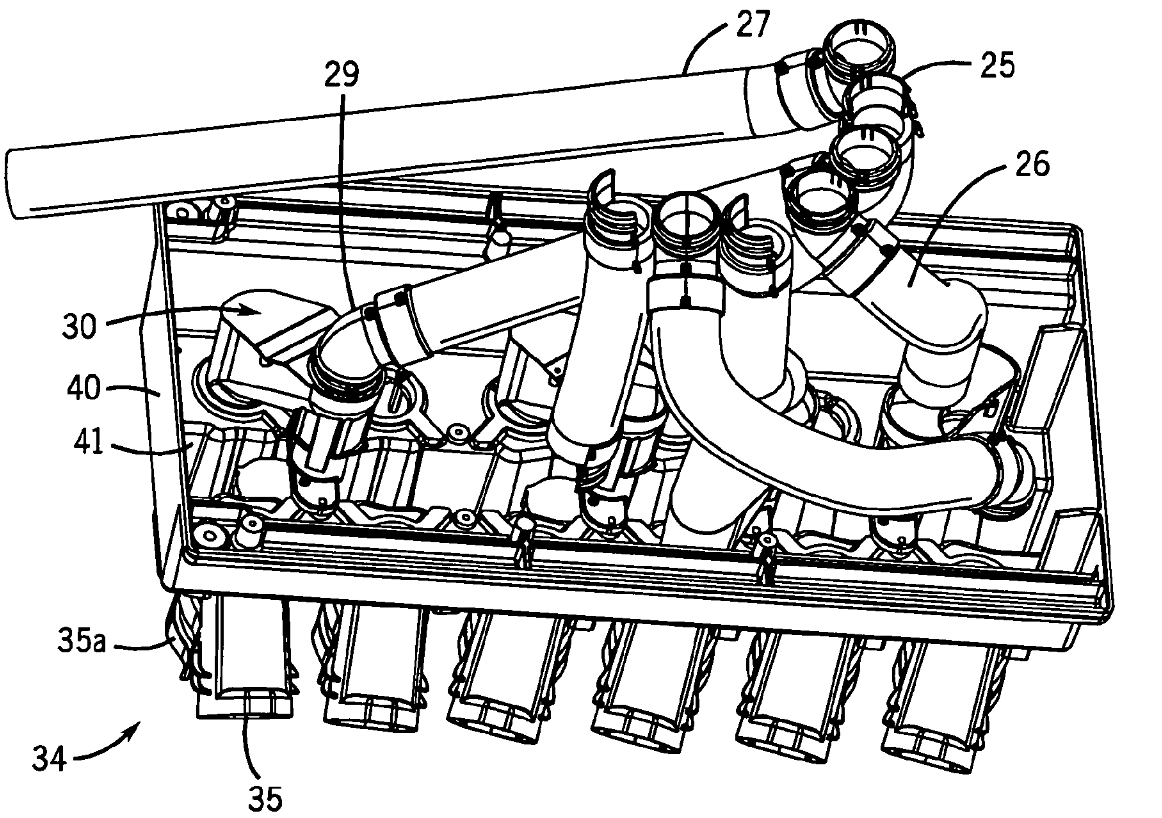
FIG. 7 is a top perspective detail of portions of the subassembly seen in FIGS. 5 and 6.
Figure 10:
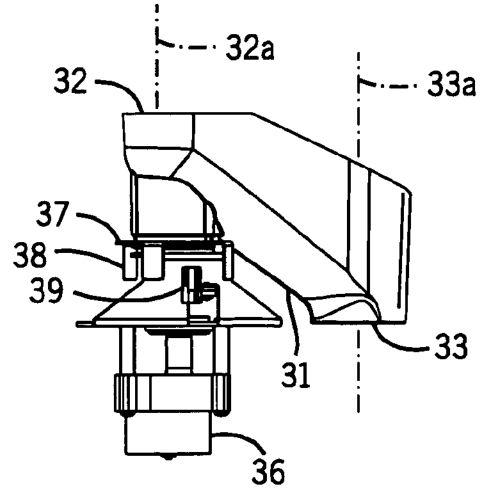
FIG. 10 is a detail view of one of the diverter subassemblies seen in FIGS. 5-9.
Figure 11:
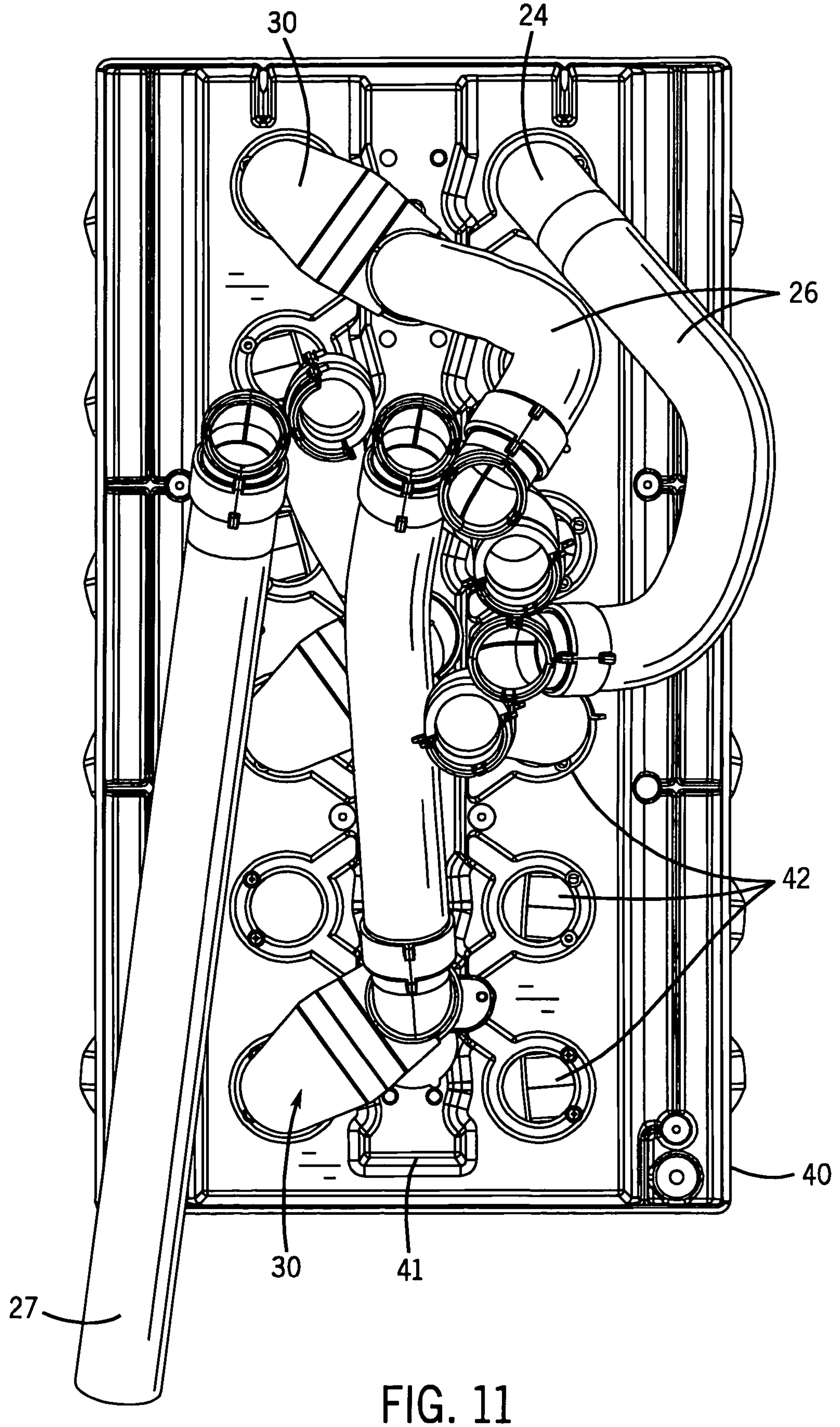
FIG. 11 is top detail view of the subassembly of FIG. 5.

As seen in FIG. 7, the chutes 26 are further coupled through lower elbow couplings 29 to diverter mechanisms 30. An individual diverter mechanism 30 is seen in FIG. 10. It has a downwardly sloped chute portion 31 that extends radially from a cylindrical entrance 32 to an exit spout 33. The cylindrical entrance 32 is formed around a pivot axis 32*a* for the diverter mechanism 30, while the cylindrical exit spout 33 is also situated about a central axis 33*a*. This diverter exit spout 33 will be aligned with a circular entrance 42 for a coin receptacle 60 that is formed in a bottom of the chassis 40 as seen in FIG. 11. It is to be noted that a lip is formed around the entrance 42 but such a lip is not necessary and could be absent in other embodiments without departing from the scope and spirit of the invention. The entrances 32 and the exit spouts 33 of the diverter chutes 31 both clear respective parts of the machine located above and below them without contacting such parts.

Figure 8:
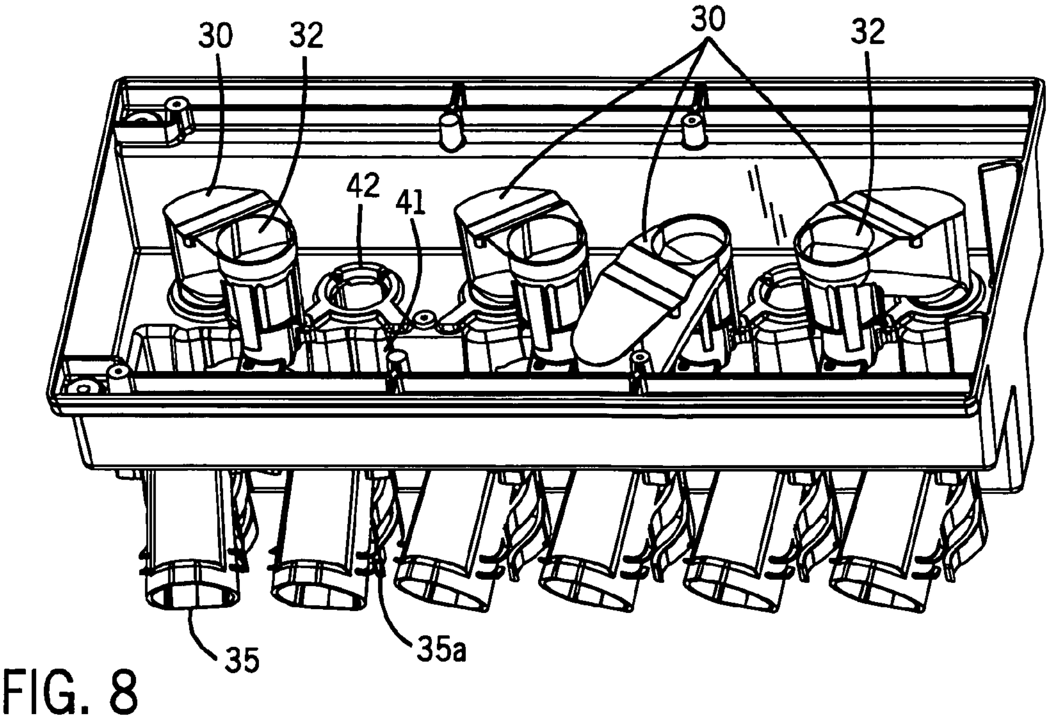
FIG. 8 is a second top perspective detail of portions of the subassembly seen in FIGS. 5 and 6.
Figure 9:
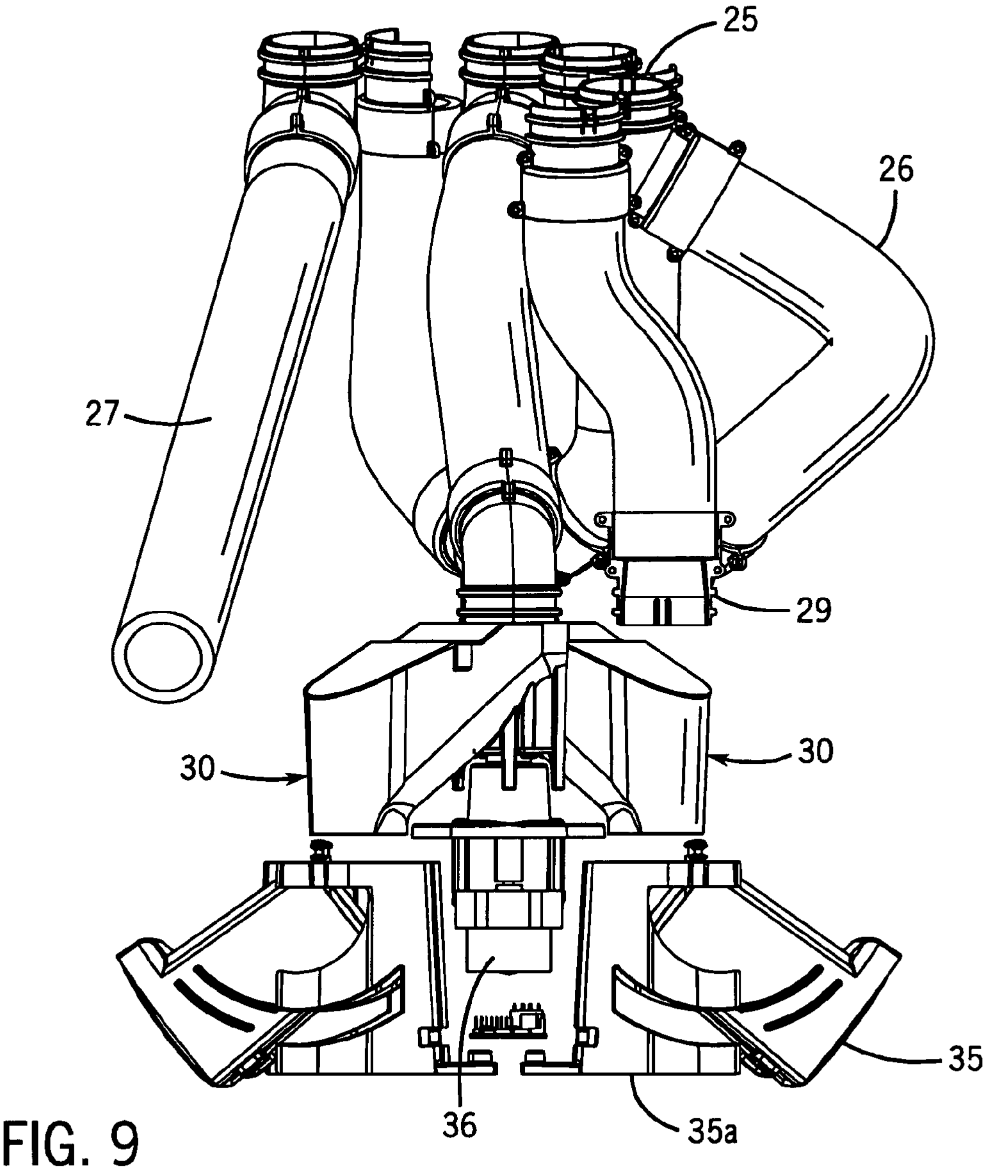
FIG. 9 is a frontal detail view of portions of the subassembly seen in FIGS. 5 and 6.

Below each receptacle entrance 42 is a bag spout assembly 34 for attaching a coin bag to receive coins. The twelve bag spout assemblies 34 are seen in FIGS. 6, 7, 8 and 9. These are described and shown in U.S. Pat. No. 6,004,200, issued Dec. 21, 1999, the disclosure of which is incorporated herein by reference. In each bag assembly 34, as seen in FIGS. 8 and 9, a bag spout 35 is pivoted in and out of a clip member 35*a*, and when the spout 35 is pivoted inward it traps the top edge of a coin bag 60 to hold the coin bag in position around the bag spout 35, as seen in FIG. 3, to receive a stream of coins.

The diverter mechanism 30 includes a stepper motor 36 seen in FIG. 10. The diverter mechanisms 30 are mounted on the chassis 40 with the stepper motors 36 disposed in a central trench 41 in the chassis 20 as seen in FIGS. 7, 8, 9 and 11. The chassis 40 is a preferably a cast aluminum member that is substantially rigid to assist alignment of the parts conveying the coins.

Referring again to FIG. 10, the diverter chute 31 is rotated through a shaft and gearing arrangement that is driven by the stepper motor 36. A collar 37 rotates with the diverter chute 31 and the collar 37 has interrupter tabs 38 or markers that are sensed by a sensor 39 to sense eight possible positions for each diverter chute 31. Each interrupter tab 38 is of a different width so that each has its own unique identity. The interrupter tabs 38 pass through a light beam of the sensor 39 so the leading and trailing edges can be detected. The number of stepper motor pulses between the leading and trailing edges determines the interrupter tab width. While processing coins, the coin diverter 30 is located in the center of one of the interrupter tabs and held in place by applying power to the stepper motor 36. If at any time there is reason to believe the diverter 30 has moved because of service intervention the coin diverter 30 is powered until the correct interrupter tab 38 can be located. The controller 53 provides for pivoting the diverter over four possible coin entrances 42, however, the diverter mechanisms 30, except the one for pennies, are more usually repositioned among two or three coin entrances 42 in the examples given below. The coin diverter mechanism 30 is rigidly cantilevered from the shaft bearing assembly and can freely pivot without frictional resistance due design clearance at the coin entrance and distribution point of the diverter 38.

Figure 12A:
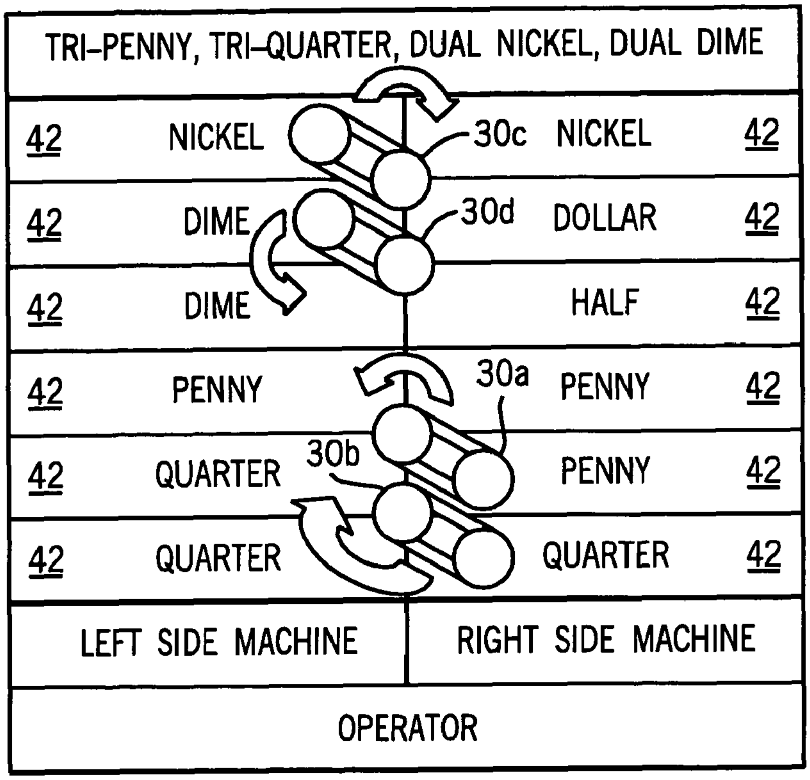
FIGS. 12*a* and 12*b* are functional diagrams of the operation of the diverter mechanisms in FIGS. 5-10.
Figure 12B:
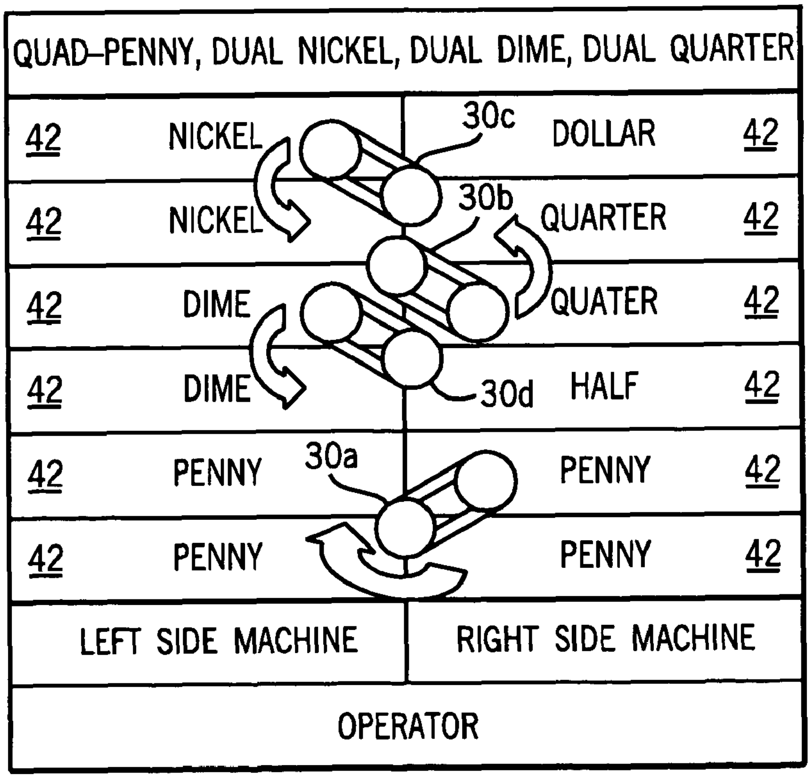

Two possible distribution arrangements are functionally illustrated in FIGS. 12*a* and 12*b*. In FIG. 12*a*, the coins are distributed to entrances 42 for three receptacles for pennies, three receptacles for quarters, two receptacles for nickels, and two receptacles for dimes. The diverter mechanisms 30*a*, 30*b* for pennies and quarters are repositioned from alignment with an entrance 42 for one receptacle to alignment with entrances 42 for two other receptacles under the control of the controller 50. The diverter mechanisms 30*c*, 30*d* for nickels and dimes are repositioned from alignment with an entrance for one receptacle to alignment with an entrance 42 for one other receptacle under the control of the controller 50. In this arrangement, four diverter mechanisms 30*a*, 30*b*, 30*c* and 30*d* are utilized. Half dollars and dollars are distributed to entrances 42 for one receptacle each and do not require diverter mechanisms 30.

In FIG. 12*b*, the coins are distributed to entrances 42 for four receptacles for pennies, entrances 42 for two receptacles for nickels, entrances 42 for two receptacles for dimes and entrances 42 for two receptacles for quarters. The diverter mechanism 30*a* for pennies is repositioned from alignment with one receptacle to alignment with each of three other receptacles under the control of the controller 53. The diverter mechanisms 30*b*, 30*c*, 30*d* for quarters, nickels and dimes are repositioned from alignment with an entrance 42 for one receptacle to alignment with an entrance 42 for one other receptacle under the control of the controller 50. As in the first example, half dollars and dollars are distributed to entrances 42 for one receptacle each and do not require diverter mechanisms 30.

Figure 13:
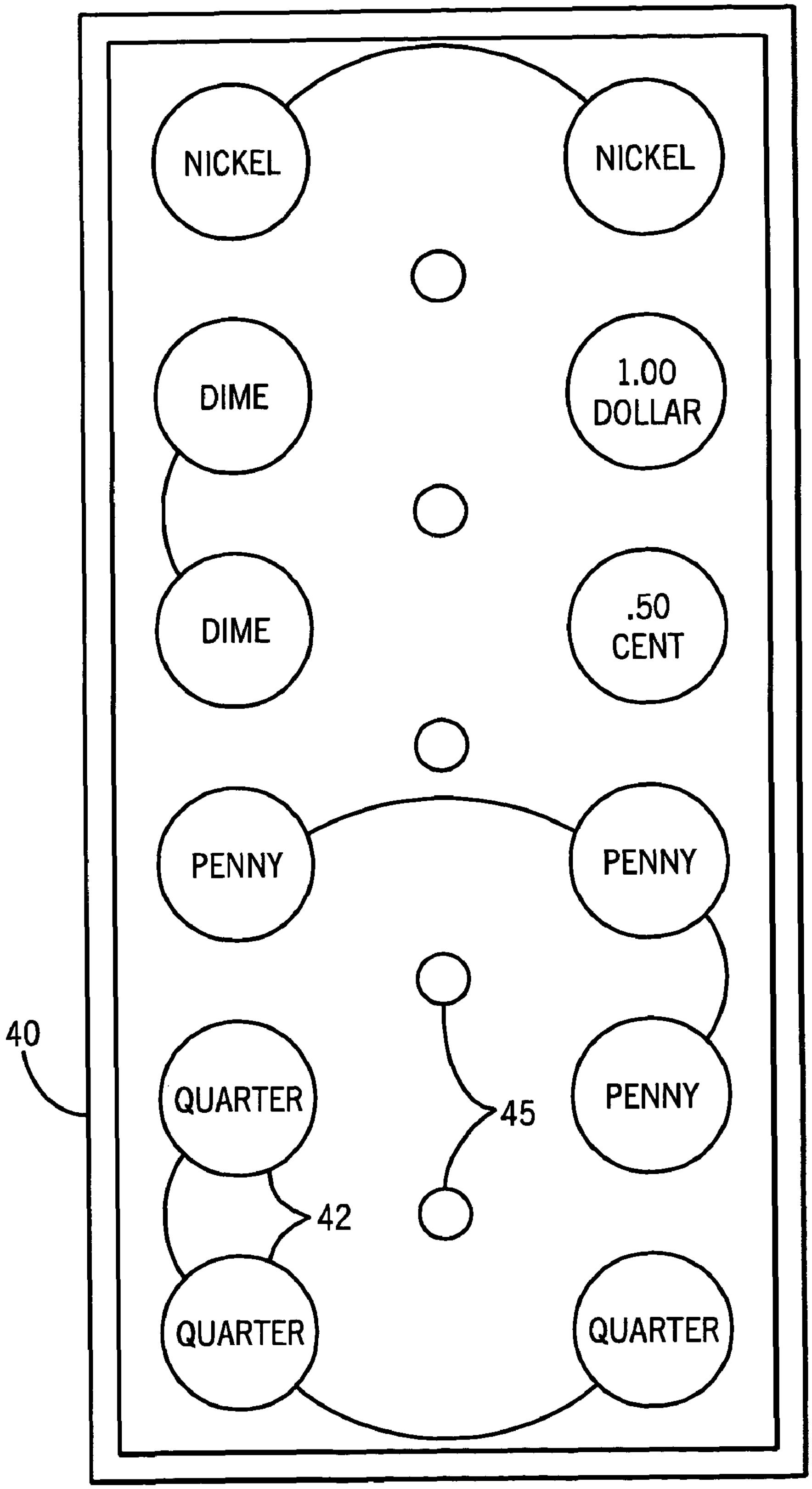
FIG. 13 is a physical layout diagram showing the ability to configure the diverter mechanisms seen in FIGS. 5-10.

As seen in FIG. 13, which is a diagram of the chassis, a variable number of diverter mechanisms, preferably four or five, can be mounted with their pivot points 45 as shown in FIG. 13. From there, the diverter mechanisms are pivoted and stopped at from one to four entrances 42 for coin receptacles 60. Thus, many possible distributions of coins to the receptacles 60 are possible. To provide a configuration for the machine 10, the diverter mechanisms 30 are positioned at a variable number of the five pivot points 45 shown in FIG. 13 and parameters are input to the controller 53 to cause the stepper motors 36 to move through as much of the 360-degree circle of motion as is necessary to position the diverter exit spout 33 at the number of coin receptacle entrances 42 between one and four that are selected for each denomination. In FIG. 13, the distribution of various denominations corresponds to FIG. 12*a*.

Figure 14:
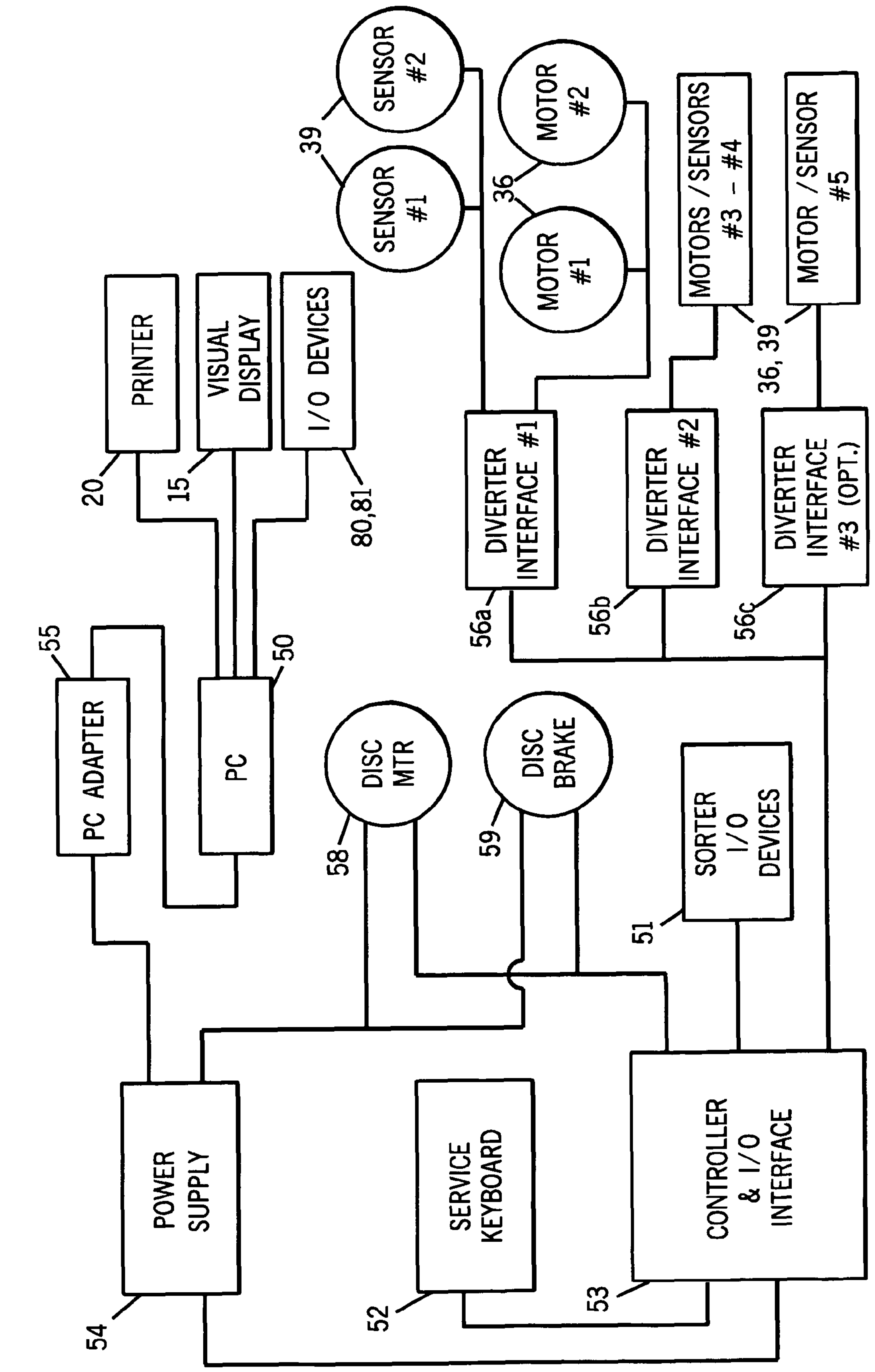
FIG. 14 is an electrical block diagram of the electronic controls for the machine of FIGS. 1-12.

As seen in FIG. 14, the power supply 54 is connected to a specialized PC power adapter 55 to the personal computer (PC) 50. The PC 50 is in turn connected to the printer 20, to the visual display 15 and to certain machine I/O devices such as the pushbuttons 80 and certain lights 81 on the exterior of the cabinet. The service keyboard 52 is connected as an input device to the controller 53 which controls the sorter disc motor 58 and brake 59. The controller 53 is a microcomputerized controller of a type disclosed in Adams et al., U.S. Pat. No. 5,992,602, issued Nov. 30, 1999, and Zwieg et al., U.S. Pat. No. 6,640,956, issued Nov. 4, 2003. It includes one or more microelectronic CPU's, a program memory, a data memory and a program that is executed by a main CPU for controlling the operations of the machine 10. The controller 53 is also connected I/O interface circuitry to I/O devices 51 such as count sensors on the sorting mechanism 22. The controller 53 also connects to interface modules 56*a*, 56*b* and 56*c* for interfacing the stepper motors 36 and the position sensors 39 for the stepper motors 36. Preferably, either four or five stepper motors 36 are typically connected (interface module #3 being optional) using the interface modules 56*a*, 56*b* and 56*c*, respectively.

Figure 15:
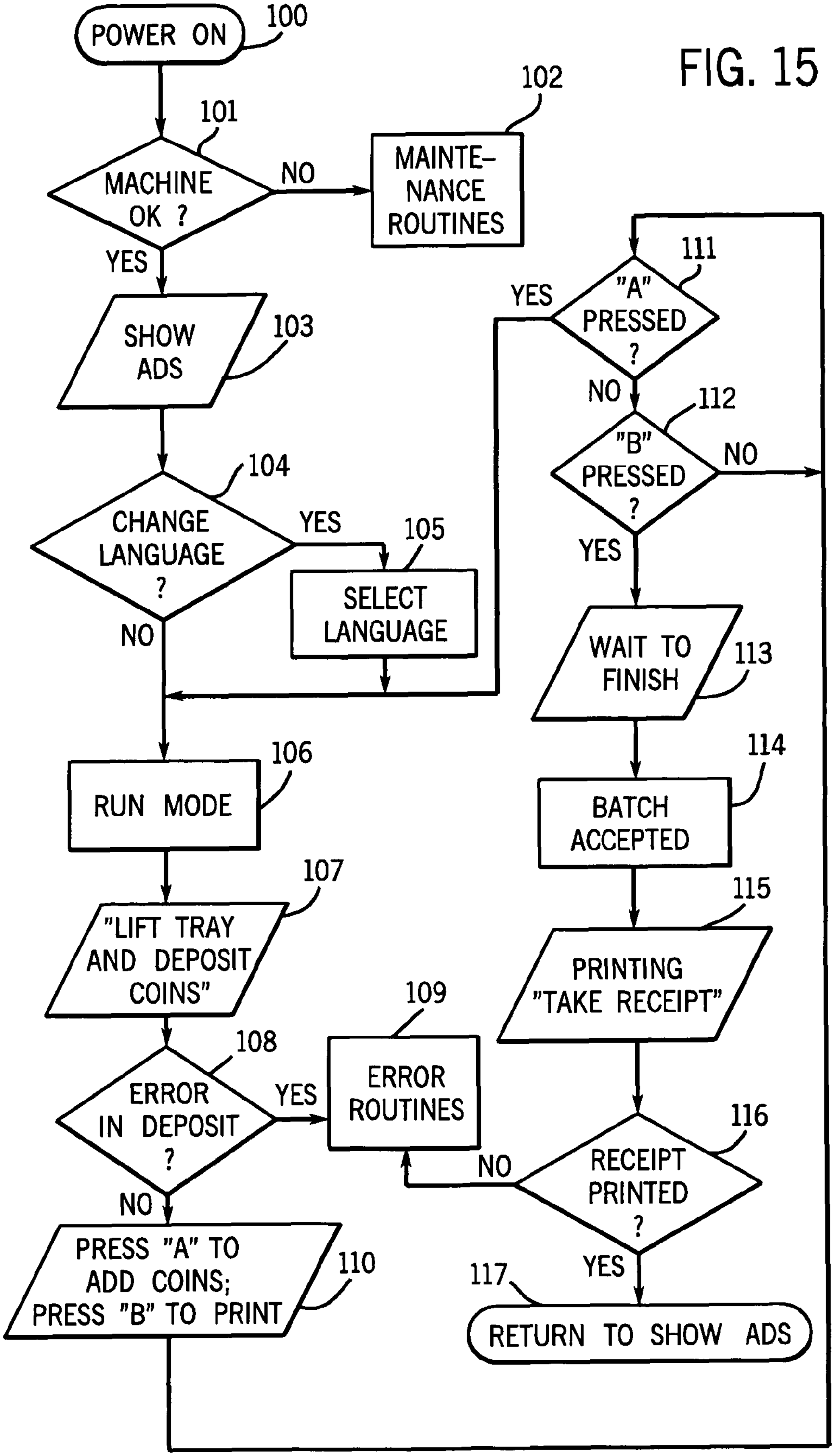
FIG. 15 is a flow chart of the operation of the machine of FIGS. 1-12.

Referring to FIG. 15, the operation of the machine 10, as controlled by controller 53, will now be described. The machine 10 is first powered up as represented by start block 100. After power up, some diagnostic checks are made as represented by decision block 101. If the machine is not operating satisfactorily or is being serviced, the controller 53 will exit to some maintenance routines as represented by the "No" result from decision block 101 and by the process block 102. If the machine is operating satisfactorily as represented by the "Yes" result from decision block 101, then the controller 50 will cause some advertising and a "welcome" greeting to be displayed on visual display 15 as represented by I/O block 103.

The user starts an operating sequence by operating either one of the buttons "A" or "B" seen in FIG. 1. The sorting mechanism 22 is powered up by switching on a motor that drives the sorting mechanism 22 and a screen is displayed on the visual display 15 that allows the user to change the language of the screen dialogue as represented by decision block 104. If a selection is not made, as represented by the "No" result from decision block 104, the machine enters the "Run Mode" as represented by process block 106. In making user selections greater than an "either-or" selection, the "A" button is the scroll button that moves from one selection to another, and the "B" button is depressed to actually make a selection. If a selection of a new language is made as represented by process block 105, then the machine enters the "Run Mode" as represented by process block 106. Once the language has been accepted, a screen display, represented by I/O block 107, appears on the visual display 15 to inform the user that coins may be deposited and that the tray 18 should be lifted to feed coins into the machine. The user deposits coins in the intake tray 18 and feeds them to the sorter by tipping up the tray. The controller 53 makes a check as represented by decision block 108 to see if any error has been caused by the deposit. If an error has been caused, as represented by the "Yes" result from decision block 107, the controller 53 proceeds to execute error recovery routines represented by process block 109. If no error has been caused, as represented by the "No" result from decision block 107, the controller 53 displays a screen on the visual display, as represented by I/O block 110, with choices to enter more coins (button A) or to print a receipt for the displayed total (button B). If more coins are to be entered, button "A" is pressed as represented by the "Yes" result from decision block 111, and the sequence returns to the run mode in block 106. If no more coins are to be entered, but neither buttons "A" or "B" are operated the routine loops back to re-test for operation of buttons "A" or "B" in blocks 111 and 112. If no more coins are to be entered and a voucher or receipt is to be printed, as represented by the "No" result from decision block 111, and the "Yes" result from decision block 112, then a display is shown on the visual display to ask the user to wait for the printing of receipt, as represented by I/O block 113, process block 114 is executed for acceptance of the batch, and I/O block 115 is executed for printing the receipt and showing a screen display to advise the user to take the receipt.

A decision block 116 is then executed to check for successful printing of the voucher or receipt as represented by decision block 116. Assuming the printout was successful, as represented by the "Yes" result from decision block 116, the operation returns through return block 117 to block 103 where the advertising and welcome greeting are displayed. If the printout operation is unsuccessful, as represented by the "No" result from decision block 116, the operation proceeds to the error recovery routines represented by block 109.

From this description, it should now be apparent how the invention provides a self-service coin recycling machine, which is easy for an average user to operate, and which reliably sorts and counts the coinage deposited. The machine is easy and convenient to service, maintain and to remove the accumulated coinage. The machine is capable of dispensing a voucher, or another form of credit to the customer.

It will be apparent to those of ordinary skill in the art that other modifications might be made to these embodiments without departing from the spirit and scope of the invention, which are defined by the following claims.

We claim:

1. A cash handling machine for receiving a batch of unsorted coinage from a user, for sorting coins into a plurality of denominations and for dispensing a receipt, a voucher or a form of credit to the user, the cash handling machine comprising:

an intake area for receiving a batch of unsorted coins which are loaded into the machine by a user;

a sorting mechanism for receiving the batch of coins from the intake area and for sorting the coins into a plurality of denominations:

a plurality of stationary chutes for receiving the coins from the sorting mechanism after they have been sorted and for conveying coins of respective denominations;

a plurality of coin receptacle entrances for alignment with a plurality of coin receptacles for receiving the coins from the sorting mechanism, wherein said plurality of coin receptacle entrances are arranged in two rows with each row having at least four receptacle entrances for accommodating two rows of coin receptacles having a corresponding number of at least four receptacles in each row;

at least three pivotable coin diverter chutes for receiving coins from the stationary chutes, the pivotable coin diverter chutes being disposed on pivot points located between the two rows of receptacle entrances, at least two of the pivotable coin diverter chutes being configured to pivotably access only two coin receptacle entrances, and at least one of the pivotable coin diverter chutes being configured to pivotablv access three or more coin receptacle entrances without any of the pivotable coin diverter chutes accessing coin receptacle entrances accessed by the other ones of the pivotable coin diverter chutes; and further comprising a one-piece substantially rigid support on which the coin diverter chutes are supported, the substantially rigid support forming the coin receptacle entrances for alignment with the coin receptacles and the support being slidable out of a front of the machine for access to the coin diverter chutes.

2. The cash handling machine of claim 1, further comprising coin receptacle holders mounted to the substantially rigid support below the coin receptacle entrances for holding coin receptacles in position below the coin receptacle entrances.

3. The cash handling machine of claim 2, wherein the coin receptacle holders are bag spout assemblies and wherein the coin receptacles are coin bags.

4. A cash handling machine for receiving a batch of unsorted coinage from a user, for sorting coins into a plurality of denominations and for dispensing a receipt, a voucher or a form of credit to the user, the cash handling machine comprising:

an intake area for receiving a batch of unsorted coins which are loaded into the machine by a user;

a sorting mechanism for receiving the batch of coins from the intake area and for sorting the coins into a plurality of denominations;

a plurality of stationary chutes for receiving the coins from the sorting mechanism after they have been sorted and for conveying coins of respective denominations;

a plurality of coin receptacle entrances for alignment with a plurality of coin receptacles for receiving the coins from the sorting mechanism, wherein said plurality of coin receptacle entrances are arranged in two rows with each row having at least four receptacle entrances for accommodating two rows of coin receptacles having a corresponding number of at least four receptacles in each row;

a substantially rigid support defining a top wall of a compartment within a housing, the substantially rigid support forming the coin receptacle entrances for alignment with the coin receptacles and wherein the compartment is sized to contain an array of coin receptacles in a range from 2×4 to 2×6; and at least four pivotable coin diverter chutes for receiving coins from the stationary chutes, the pivotable coin diverter chutes being disposed on pivot points on the substantially rigid support and being located between the two rows of receptacle entrances, at least two of the pivotable coin diverter chutes being configured to pivotably access only two coin receptacle entrances, and at least one of the pivotable coin diverter chutes being configured to pivotably access three or more coin receptacle entrances without any of the pivotable coin diverter chutes accessing coin receptacle entrances accessed by the other ones of the pivotable coin diverter chutes.

5. The cash handling machine of claim 4, wherein the support defines a top wall that also separates the compartment from the sorting mechanism and the plurality of chutes.

6. The cash redemption machine of claim 4, wherein at least two of the four pivotable coin diverter chutes are pivotable to access three coin receptacle entrances without overlapping the two coin receptacle entrances accessed by the first-mentioned two pivotable coin diverter chutes.

7. The cash redemption machine of claim 5, wherein the two of the four pivotable coin diverter chutes that are pivotable to access three coin receptacle entrances are positioned to convey quarters and pennies, respectively, which are received from the sorter, and wherein two of the four pivotable coin diverter chutes are positioned to convey nickels and dimes, respectively, which are received from the sorting mechanism, to two receptacle entrances each.

8. The cash handling machine of claim 7, wherein two stationary chutes are positioned between the sorter and the coin receptacles so as to convey coins of corresponding denominations from the sorter to only one coin receptacle each.

9. The cash handling machine of claim 8, wherein the coin receptacles receiving only one denomination receive half dollars and dollars, respectively.

10. The cash handling machine of claim 4, wherein three of the four pivotable coin diverter chutes are pivotable to access two coin receptacle entrances, and one of the four pivotable coin diverter chutes is pivotable to access four coin receptacle entrances without overlapping the coin receptacle entrances accessed by the three coin diverter chutes.

11. The cash handling machine of claim 10, wherein the coin diverter chute accessing four coin receptacle entrances is positioned to convey pennies to four coin receptacle entrances, while the other three coin diverters are positioned to convey nickel, dimes and quarters, respectively.

12. The cash handling machine of claim 9, wherein two of the plurality of stationary chutes are positioned between the sorting mechanism and the coin receptacles to convey coins of corresponding denominations from the sorter to only one coin receptacle each.

13. The cash handling machine of claim 4, wherein certain ones of the diverter chutes have physically overlapping paths of motion when pivoted around 360 degrees to each access two receptacle entrances that are accessible by an adjoining one of the diverter chutes; and further comprising means for limiting the motion of the certain ones of the diverter chutes to rotation to less than 360 degrees and to prevent overlap or interference with other coin diverter chutes.

* * * * *